United States Patent [19]
Ivan et al.

[11] Patent Number: 5,877,501
[45] Date of Patent: Mar. 2, 1999

[54] DIGITAL PANEL FOR X-RAY IMAGE ACQUISITION

[75] Inventors: Andrew J. Ivan, Aurora; Pieter Gerhard Roos, Chagrin Falls; Michael A. Lopez, Solon, all of Ohio

[73] Assignee: Picker International, Inc., Cleveland, Ohio

[21] Appl. No.: 756,136

[22] Filed: Nov. 26, 1996

[51] Int. Cl.[6] .................................. G01T 1/29; G01T 1/24
[52] U.S. Cl. .................... 250/370.09; 250/580; 378/98.8
[58] Field of Search ............................... 250/370.09, 580; 378/98.8

[56] References Cited

U.S. PATENT DOCUMENTS

| | | |
|---|---|---|
| 5,117,114 | 5/1893 | Street et al. . |
| 5,168,160 | 12/1894 | Jeromin et al. . |
| 5,187,584 | 2/1993 | Nishiki et al. ........................ 378/98.8 X |
| 5,313,066 | 5/1994 | Lee et al. . |
| 5,319,206 | 6/1994 | Lee et al. . |
| 5,331,166 | 7/1994 | Yamamoto et al. ................ 250/370.09 |
| 5,331,179 | 7/1994 | Lee et al. . |
| 5,454,022 | 9/1995 | Lee et al. ............................. 378/98.8 |
| 5,514,873 | 5/1996 | Schulze-Ganzlin et al. .. 250/370.09 X |
| 5,608,774 | 3/1997 | Polichar et al. ........................ 378/98.8 |

Primary Examiner—Edward J. Glick
Attorney, Agent, or Firm—Timothy B. Gurin; John J. Fry

[57] ABSTRACT

A detector assembly for x-ray image acquisition includes a flat panel detector array. The detector assembly also includes a rechargeable battery, an analog to digital converter, and an image memory. The battery provides electrical power to the detector assembly so that image data may be acquired without using a power source external to the assembly. The image data is stored in a memory. The detector is subsequently be connected to a docking station which includes a battery charger. The image data is downloaded, and the battery is recharged.

24 Claims, 2 Drawing Sheets

DIGITAL PANEL FOR X-RAY IMAGE ACQUISITION

BACKGROUND

The present invention relates to the art of x-ray imaging. It finds particular application in connection with radiography and fluoroscopy and will be described with reference thereto.

Radiographic images have traditionally been recorded on photographic film, which is ordinarily mounted in contact with one or more intensifying screens. The screen-film combination is housed in a cassette, which can be placed in a Bucky, filmer, wall mount, or other desired location. After the screen-film combination is exposed to x-radiation, the film is processed in a series of chemical solutions which produce a human readable image. Although film based systems are well known and have been used for many years, these systems have various drawbacks. The need to process the film delays image availability, introduces variables that can negatively impact image quality, and introduces additional handling, service and cost. The resultant image is in analog form; a separate digitizing step is required to convert the image to digital form.

Storage phosphor screen cassettes have also been used to produce radiographic images for example as disclosed in U.S. Pat. No. 5,072,118 to Konno. These systems use a reusable phosphor to retain an x-ray image, and a laser scanning device to create a digital representation of the image. Because one screen is required for each exposure, phosphor screen systems are limited to radiology. The laser scanning step can also impact image quality and requires additional handling, service, and cost.

Other systems include an image intensifier tube which produces an amplified, visible image, and a television or video camera. The camera acquires the image as a single image for spot radiography or as a continuing image for fluoroscopy. These systems tend to be large and heavy, thus limiting positioning flexibility, and generally have insufficient resolution for radiographic applications.

More recently, digital radiography systems have been developed. These systems typically include a flat panel image detector which includes a scintillator layer and an addressable silicon detector array. Each of the elements in the array convert the light detected by it into an electrical charge. This charge is converted into an equivalent digital signal for further processing and storage. One such image detector is disclosed in U.S. Pat. No. 5,117,114, Street, et al., issued May 26, 1992. Other image detectors do not include a scintillator layer; the detectors convert incident radiation into an electrical charge using a selenium photoconductor layer on top of a microcapacitor matrix. Such detectors are disclosed, for example in U.S. Pat. Nos. 5,331,179 and 5,319,206 to Lee, et al. In either case, the image detector is connected to a power supply or other source of power. Similarly, the image detector input/output lines are connected to an image processor. Yet other flat panel image detectors are known in the art and are readily available.

Digital radiography (DR) systems facilitate the production of direct, digital x-ray image information. This digital information is readily transferred to picture archival and communications systems (PACS) and other computer networks. A drawback to existing digital radiography systems, however, is that the power and I/O connections to the image detector are accomplished using wiring such as cables. This cabling restricts the physical placement of the detector. Provisions for accommodating the cabling must be provided, and the technologist must also take care in placing the wires relative to the patient and the x-ray image. Further, existing x-ray systems may be poorly suited to accepting the requisite power and signal cabling, thus limiting the utility of the DR systems in upgrade or retrofit applications.

SUMMARY

The present invention addresses these shortcomings, and others.

According to a first aspect of the invention, a detector assembly for acquiring x-ray image data include a means for acquiring image data indicative of radiation incident on the assembly and a power storage device, such as a battery, for providing power to the acquisition means. According to other limited aspects of the invention, the detector assembly may contain a memory or other means for storing the image data.

According to other limited aspects of the invention, the assembly includes an image data interface such as a serial or a parallel interface and a data transfer means such as a connector or an infrared or radio frequency transmitter. According to still other limited aspects of the invention, the battery may be a rechargeable battery, which may be recharged using a power transfer means such as a connector or an inductive coupling loop. The detector may include a status display, and the means for acquiring may be a silicon detector array or a microcapacitor array.

According to another aspect of the invention, an x-ray detector assembly includes a means for acquiring image data and a means for storing the image data. A data transfer means is connected to the image data interface. A rechargeable power storage device provides electrical power, and an energy transfer means provides power to recharge the batteries.

According to yet another aspect of the invention, an x-ray detector system includes a detector assembly and a base station. The detector assembly includes an x-ray detector array, means for generating image data indicative of radiation incident on the detector, a first data interface adapted to receive the image data, a first data transfer means operatively connected to the first data interface, and a power storage device for providing electrical power. The base station includes a second data transfer means which is adapted to receive data from the first data transfer means. According to another limited aspect of the invention, the power storage device is a battery and the base station includes a battery charger.

One advantage of the present invention is that the detector assembly no longer requires data and power cables. Another advantage is that the detector assembly is portable. Still another advantage is that the detector assembly may readily be placed in a desired position. Still other advantages will be understood by those skilled in the art upon reading and understanding the appended description.

DRAWINGS

DESCRIPTION

Figure 1:
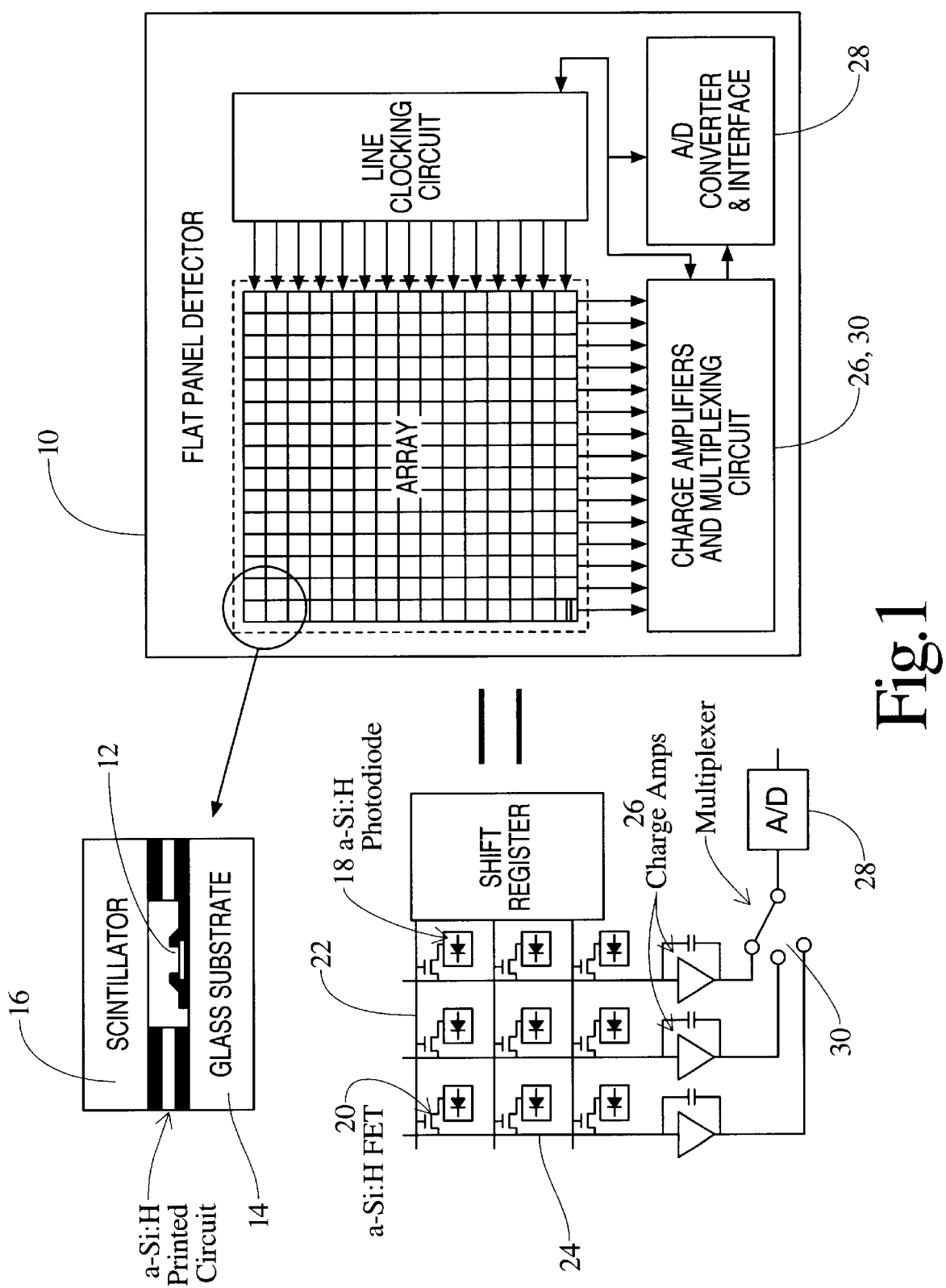
FIG. 1 is a block diagram of an exemplary flat panel detector.
Figure 2:
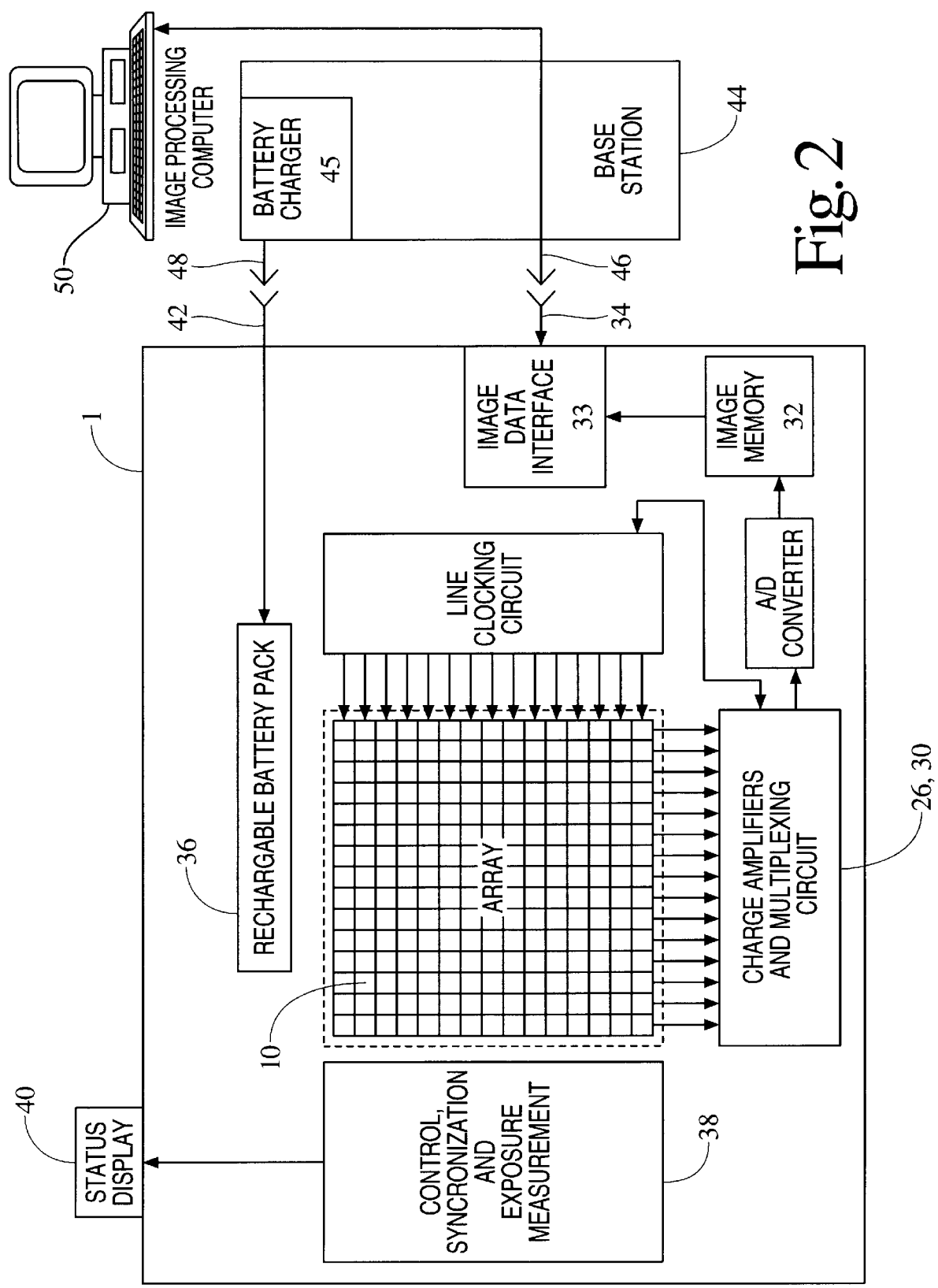
FIG. 2 is a block diagram of a detector assembly according to the present invention.

With reference to FIGS. 1 and 2, an x-ray detector assembly 1 includes a detector array 10 having a matrix of photosensitive elements 12 disposed on a glass substrate 14.

A scintillator layer 16 is disposed on top of the photosensitive elements for converting x-rays to light which is detected by the elements 12. The photosensitive elements 12 (usually referred to as picture elements or pixels) are printed in a matrix of regularly spaced rows and columns.

In the preferred embodiment, the detector array 10 has a 14×17 or 12×16 inch active area, and the detector assembly is packaged in a housing which is mechanically compatible with a standard 14×17 inch film screen cassette. Thus, the detector assembly may be placed in the tray of a standard radiographic table, a firmer, or in a wall mounted holder. Of course, the image detector may have a different active area and may be packaged in an alternately sized housing to suit the needs of a particular application.

Each pixel includes a light sensitive amorphous silicon photodiode 18 connected to the source of amorphous silicon switching field effect transistor 20 ("FET") . The gates of the FETs in each row of the matrix are connected to a row enable line 22. Application of a positive voltage to a row enable line switches all of the FET's in that row to the on, or electrically conducting state. The drains of each FET are connected to a column signal line 24. It should be noted that other switch devices may be used. For example, back-to-back diode switches may be used.

Each column signal line is in turn connected to a corresponding charge amplifier 26 which produces a voltage proportional to the sum of the electrical charges present on the column signal line 24. The charge amplifiers 26 are resettable storage devices that retain the total of the electrical charge collected from the associated column signal lines 24 until provided with a reset signal. By enabling all the gates in a given row, the electrical charge signal that was accumulated by each photodiode 18 in that row is transferred to amplifier 26.

The outputs of each preamplifier 26 are connected via multiplexer 30 to an analog to digital converter 28 preferably having 12 bit or better resolution. The output of the A/D converter 28 is in turn coupled to an addressable image memory 32 which stores the digital value associated with each pixel The sequence for producing an x-ray image is as follows:
Turn all the row enable lines off;
Turn on the x-ray source for a desired time period;
Starting at the top of the array, send the charge accumulated by each of the photodiodes 18 in each row of pixels, to their respective charge amplifiers 26 by turning on the row enable lines 22 in sequence;
For each row, scan the output voltage of each amplifier 26, in sequence, to the A/D converter 28 and reset the amplifiers 26 when all of their outputs have been sampled; and
Store the digital value corresponding to each pixel in the image memory 32.

When all the rows in the matrix have been sampled, the array is ready for the next X-ray exposure.

Other types of detector arrays may be used, for example those of the type disclosed in U.S. Pat. Nos. 5,331,179 and 5,319,206 to Lee, which convert the incident radiation directly to electrical charge using a selenium photoconductor layer on top of a microcapacitor matrix.

The process of scanning the detector array 10 and A/D conversion of the resultant data is directed by a controller 38. In particular, the controller 38 synchronizes the enabling of the row enable lines 22, the operation of the multiplexer 30 and A/D converter 28, and the storage of the resultant data in the memory 32.

The image memory 32 is connected to an image data interface such as a high speed serial interface 33 which permits the data in the image memory 32 to be read as a stream of serial data. In an alternative embodiment, a parallel interface can be used. A data transfer device such a connector 34 makes the data available at the exterior of the detector assembly 1.

The detector assembly also includes a power storage device such as one or more rechargeable batteries 36 which supply electrical power to the detector array 10 and associated electronics. Voltage converters provide the voltages required by the various devices. Electrical power for recharging the battery is provided using a power transfer device such as a connector 42 accessible from the exterior of the detector assembly. The data 34 and power 42 connectors may of course be combined into a single connector.

A status display 40 includes one or more human readable indicators such as LEDs or LCDs. Low battery, error codes, and power indications are provided. A power switch allows the operator to turn the image detector on and off as desired.

The detector assembly 1 interfaces with a corresponding base station 44, which includes a data transfer device such as a connector 46 and a power transfer device such as connector 48. The base station 44 also includes a battery charger 45 connected to an external ac power source. The connectors 46, 48 on the base station mate with the corresponding connectors 34, 42 on the detector assembly 1. When so mated, the batteries 36 are recharged, and image data is downloaded from the image memory 32. According to one embodiment, the base station 44 is built in to the Bucky tray of a standard radiographic table. Of course, the base station 44 may be placed in any other convenient location.

The base station 44 is connected to an image processing computer 50 which receives the image information from the detector assembly 1. The computer 50 processes the image data for display on a monitor, storage and archiving, printing, and the like. It will be appreciated that the computer 50 may be connected to a computer network such as a PACS network.

In operation, the detector assembly 1 is connected with the base station 44 to charge the batteries 36. To take an image, the detector assembly is uncoupled from the base station 44 and placed in a desired position. Of course, if the base station 44 is mounted so that the image detector is at the desired position, the detector assembly can remain coupled to the docking station. The detector assembly 1 power is turned on, and the object being imaged and the image detector are exposed to a source of x-radiation. The detector array 10 is scanned and a digital representation of the image is stored in the image memory 34. The detector assembly 1 is then returned to the base station. The image data is downloaded for further processing by the computer 50, and the batteries are recharged.

The invention may also take other forms. For example, the data transfer means 34, 46 and/or the power transfer means 42, 48 may take wireless form. Thus, image data can be transferred using a radio frequency communications link, such as a 900 MHz link, or an infrared communications link, with corresponding transmitters and receivers built into the detector assembly 1 and base station 44, respectively. Similarly, wireless connections to the battery charger 42 may be made via an inductive coupling loop, with corresponding coupling loops built into the detector assembly 1 and the base station 44. If a sufficiently high speed wireless communications link is provided, the image data may be transferred substantially as it is acquired, and image memory 32 may take the form of a buffer or latch, or be omitted.

The image memory 32 may also be implemented using a nonvolatile memory such as a battery backed RAM, EEPROM, or the like. According to such an embodiment, the image data is retained even though the battery 36 becomes discharged. The memory 32 may also take the form of a replaceable memory cartridge which a battery backed RAM, EEPROM, disk storage device, or the like. After imaging, the memory cartridge 32 is removed from the detector 1 and placed in a complementary socket, disk drive, or the like. The data is then downloaded for use by the workstation 50.

The detector assembly 1 may also be adapted to retain multiple images. Thus, the image memory 32 may contain sufficient storage capacity to store the desired number of images. A button or switch on the detector assembly 1 housing allows the operator to indicate that an exposure has been completed and to signal that a subsequent exposure is forthcoming. Alternatively, the image detector may sense incoming radiation. After incoming radiation has been sensed, but discontinued, the controller 38 automatically determines that an exposure has been completed, completes the acquisition of the image data, and prepares the detector for the next exposure. Status display 40 also indicates the number of images which have been taken and stored in the image memory. When acquisition of the desired number or images is complete, the detector assembly 1 is returned to the base station 44 the image data downloaded from the memory 32.

Automatic exposure control (AEC) may also be provided. According to a first implementation, an AEC sensor such an ion chamber is mounted to the Bucky, filmer, wall mount, or other support, preferably in front of the detector assembly. Alternatively, one or more AEC sensors may be embedded in the detector array 10. The AEC signal is transmitted using the wireless data link. Alternatively, an AEC signal connector may engage a mating connector when the image detector is placed in one or more desired positions. In any case, the AEC signal is provided to the associated X-ray generator to terminate the exposure when the desired amount of radiation has been received.

The invention has been described with reference to the preferred embodiment. Obviously, modifications and alterations will occur to others upon reading an understanding the preceding description. It is intended that the invention be construed as including all such modifications an alterations insofar as they come within the scope of the appended claims or the equivalents thereof.

Having described the preferred embodiment, the invention is now claimed to be:

1. A detector assembly for medical x-ray image acquisition, the assembly comprising:
   one of an amorphous silicon detector array and a microcapacitor matrix array for acquiring image data indicative of radiation incident on the assembly, the array requiring a source of electrical power;
   power storage means for providing electrical power to the array; and
   a housing which houses the array and the power storage means.

2. The assembly of claim 1 further comprising means for storing the image data, wherein the means for storing is housed by the housing.

3. The assembly of claim 2 further comprising
   an image data interface operatively connected to the means for storing; and
   a data transfer means operatively connected to the image data interface, wherein the image data interface and the data transfer means are housed by the housing.

4. The assembly of claim 3 wherein the interface is one of a serial and a parallel interface.

5. The assembly of claim 3 wherein the data transfer means is a connector.

6. The assembly of claim 1 farther comprising one of a radio frequency transmitter and an infrared transmitter, wherein the one of the radio frequency transmitter and the infrared transmitter are housed by the housing.

7. The assembly of claim 1 wherein the power storage means comprises a battery.

8. The assembly of claim 1 wherein the battery is a rechargeable battery and the assembly further comprises power transfer means for providing power to recharge the battery.

9. The assembly of claim 8 wherein the power transfer means comprises one of an electrical connector and an inductive coupling loop.

10. The assembly of claim 1 further comprising a status display.

11. The assembly of claim 10 wherein the status display comprises a LCD display.

12. The assembly of claim 1 wherein the active area of the array is of a size sufficient to acquire an image of a human chest.

13. The assembly of claim 12 wherein the housing is mechanically compatible with a 14×17 inch film screen cassette.

14. A detector assembly for medical x-ray image acquisition, the assembly comprising one of an amorphous silicon detector array and a microcapacitor matrix array which acquires image data indicative of radiation incident on the assembly, the array requiring a source of electrical power;
   means for storing the image data;
   an image data interface operatively connected to the means for storing;
   a data transfer means operatively connected to the image data interface;
   a rechargeable battery, the rechargeable battery providing electrical power;
   power transfer means for providing power to recharge the battery; and
   a housing, wherein the array, means for storing, image data interface, data transfer means, rechargeable battery, and power transfer means are housed by the housing.

15. The detector assembly of claim 14 wherein said means for storing comprises means for storing image data representative of a plurality of images.

16. The detector assembly of claim 14 further comprising means for providing an automatic exposure control signal, wherein the means for providing is housed by the housing.

17. The assembly of claim 14 wherein the housing is mechanically compatible with a 14×17 inch film screen cassette.

18. The assembly of claim 17 wherein the active area of the array is of a size sufficient to acquire an image of a human chest.

19. An medical x-ray detector system comprising:
   a detector assembly comprising
      one of an amorphous silicon and a microcapacitor matrix x-ray detector array;
      means for generating image data indicative of radiation incident on the detector array;
      a first data interface adapted to receive the image data;
      a first data transfer means operatively connected to the first data interface;

a power storage device for providing electrical power; and a housing, wherein the detector array, means for generating, first data interface, first data transfer means, and power storage device are housed by the housing; and a base station comprising a second data transfer means, the second data transfer means adapted to receive data from the first data transfer means.

20. The system of claim 19 wherein the detector system further comprises a memory adapted to store the image data and the first and second data transfer means are mating connectors, and wherein the memory is housed by the housing.

21. The system of claim 20 wherein the power storage device is a rechargeable battery, the detector assembly further comprises a first power transfer means for providing power to recharge the battery, and the base station further comprises a battery charger and a second power transfer means operatively connected to the battery charger.

22. The system of claim 21 wherein the first and second power transfer means comprise mating connectors.

23. A method of acquiring medical x-ray image data using a detector assembly which includes a rechargeable battery and a housing, the battery being housed by the housing, the method comprising the steps of:

connecting the battery to a source of electrical power;

charging the battery;

disconnecting the battery from the source of electrical power;

acquiring image data indicative of radiation incident on one of an amorphous silicon and a microcapacitor matrix detector array, the array being housed by the housing;

storing the image data in a memory housed by the housing; and during the steps of acquiring and storing, using the battery to provide electrical power.

24. The assembly of claim 23 wherein the active areas of the array is sufficient to acquire an image of the human chest.

* * * * *